March 8, 1927.
C. HARDY
1,620,020
VARIABLE CONDENSER
Filed Dec. 10, 1923
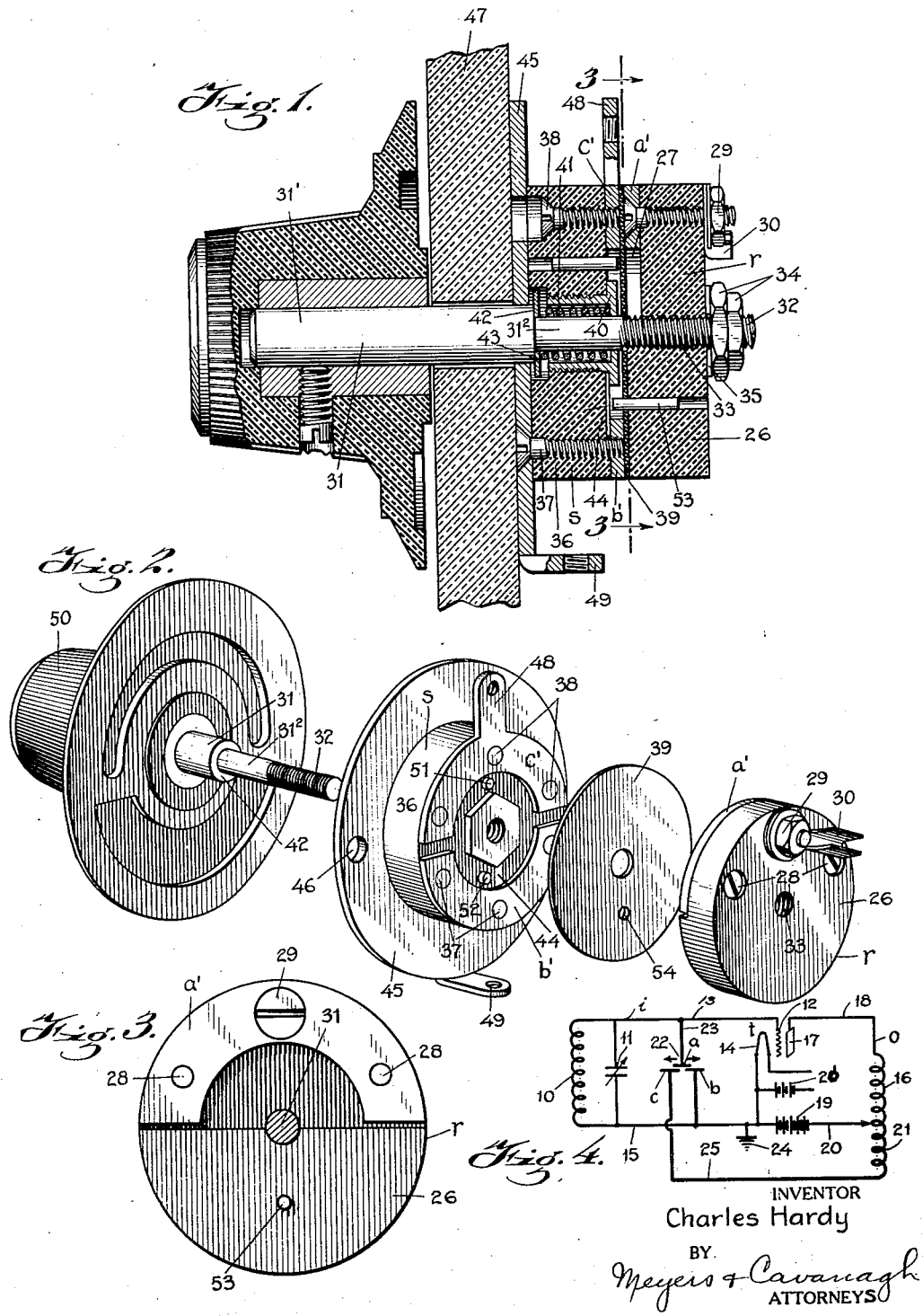
INVENTOR
Charles Hardy
BY
Meyers & Cavanagh
ATTORNEYS Patented Mar. 8, 1927.

1,620,020

UNITED STATES PATENT OFFICE.

CHARLES HARDY, OF NEW YORK, N. Y., ASSIGNOR TO AMSCO PRODUCTS INC., OF NEW YORK, N. Y., A CORPORATION OF NEW YORK.

VARIABLE CONDENSER.

Application filed December 10, 1923. Serial No. 679,727.

This invention relates to a variable condenser, and relates more particularly to a variable compensating condenser especially adapted for compensating or neutralizing the feed back or regeneration of energy from the output or plate circuit to the input or grid circuit in a relaying circuit system employing the electron discharge tube as the relay or amplifier.

In electron discharge tube relaying or amplifying systems, it is known that due to the unshieldable capacity between the plate and grid circuits such as the grid plate internal capacity of the electron discharge tube and the capacity of the leads or conductors connected thereto, a regeneration or feed back of energy from the output or plate circuit to the input or grid circuit takes place which gives rise to objectionable distortion of the input voltage power wave form and to undesirable incipient or sustained oscillations in the grid circuit. To neutralize and eliminate the feed back due to this capacitive coupling between the circuits, it has been suggested to provide means for impressing a charge upon the grid which is equal in magnitude and opposite in sign to the charge impressed thereon from the plate, such means being obtained by coupling an impedance to the output impedance of the plate circuit for creating a potential equal and opposite to that impressed upon the plate and for impressing such potential upon a condenser which is connected to the grid or high potential side of the input circuit, the capacity of the condenser being made equal to the unshieldable capacity between the grid and plate circuits so that the neutralizing charge is equal to the feed back charge. This condenser is made adjustable or variable for adapting the same to the various types or makes of electron discharge tubes, the internal capacities of which vary and to the capacity between the leads or conductors which may vary in different receiving sets.

For the purpose of maintaining the tuning characteristics or period of the grid or input circuit during adjustment of this compensating condenser, it has also been suggested to provide means for changing the capacity in the grid circuit inversely to the change produced in the compensating condenser, this being preferably accomplished by the provision of a three-plate or three-element compensating condenser providing two plate sets, two plates being formed as the stator element and the third plate as the movable element, movement of the latter effecting the change in capacity of one set inversely with respect to the change in the other set. In the preferred practice, the movable plate and one of the stator plates of this compensating condenser are connected to high potential points of the grid plate circuits and the remaining stator plate is connected to a low potential point and preferably a ground potential point of the circuits.

Since the internal capacity of the electron discharge tube is very small, this being of the order of 6 to 10 mmf.'s, it will be appreciated that the adjustment and the relative positions of the plates of the compensating condenser, the capacity values of which are of the same order of magnitude, must be maintained with a high degree of accuracy. One of the prime desiderata of my present invention comprehends the provision of a compensating condenser construction in which the desired degree of accuracy of adjustment and position of the plates is obtained and maintained during service.

Another important consideration in the making of this compensating condenser is the proper electrostatic shielding of the high potential parts of the condenser so that the adjustment or setting of the condenser will be unaffected by the hand or body of the operator or user, effective shielding being essential especially in view of the very low capacitance values involved. In practice, since the movable plate is at a high potential, it is insulated from the operating shaft thereof and the said shaft is connected to the stator grounded plate so that the shaft is also at ground potential. To produce the desired shielding, the electrical contact between the operating shaft and the grounded stator plate should be always maintained; and a further desideratum of my present invention comprehends the provision of a construction in which the movable shaft and the stator plate are conductively connected in a simple and in an effective manner to maintain the integrity of the electrostatic shield.

Further principal objects of the present invention include the provision of a compensating condenser in which the above-mentioned results are accomplished by substantially the same elements or parts producing a simplified structure; the still further provision of a condenser construction in which the parts are relatively arranged to permit of facility of assembling; and the further provision of a condenser of this nature in which the three plates are provided with distinguishable means for connection to the various parts of the tube circuit so as to facilitate the assembling of the receiving set to aid in speeding production of the same.

To the accomplishment of the foregoing and such other objects as may hereinafter appear, my invention consists in the elements and their relation one to the other as hereinafter particularly described and sought to be defined in the claims; reference being had to the accompanying drawings which show a preferred embodiment of my invention, and in which:

Figure 1 is an enlarged cross-sectional view of the improved compensating condenser of my invention, Fig. 2 is a perspective view thereof showing the parts detached and showing the manner of assembling the same, Fig. 3 is a view taken in cross-section on the line 3—3, Fig. 1, and Fig. 4 is a diagram of a tube circuit system exemplifying a mode of application or use of the compensating condenser.

Referring first to Fig. 4 of the drawings, I show a relaying or amplifying system employing the electron discharge tube in which the compensating condenser is used. The said relaying system comprises briefly an input or controlling circuit $i$ and an output or controlled circuit $o$ connected to the elements of the electron discharge tube $t$. The input or controlling circuit comprises an inductor 10 which is arranged to be inductively connected for energy reception to an antenna or other power source, a variable condenser 11, adjustment of which varies the tuning characteristics of the circuit in accordance with the freqeuncy desired to be selected, one terminal of the inductor and condenser being connected to the grid 12 of the electron discharge tube $t$ by means of the conductor 13, the other terminal of the inductor and condenser being connected to the filament 14 of the tube by means of the conductor 15. The output circuit $o$ includes an output impedance 16 which may be a primary of a transformer arranged to be coupled to a secondary (not shown) for transmitting energy to other circuits for rectification or further amplification if desired, the output impedance being connected to the plate 17 of the tube by means of the conductor 18 and to the B battery 19 by means of the conductor 20, the said B battery being in turn connected to the filament 14, the latter being heated to incandescence for producing the electron discharge stream by means of an A battery 20'.

For compensating or neutralizing the capacity between the grid 12 and plate 17, there is provided an output impedance 21 coupled to the impedance 16, this for creating a potential opposite to that produced by the impedance 16 and a condenser 22 having a plurality of plates $a$, $b$ and $c$ upon which the said potential is impressed for impressing a charge on the grid or high potential part of the grid circuit equal in magnitude and opposite in sign to the charge transferred to the grid from the plate. The plate $a$ of the condenser 22 is preferably the movable plate and is connected to the conductor 13 by means of the conductor 23 and the plates $b$ and $c$ are preferably arranged as the stator plates, the plate $b$ being connected to the filament end of the grid circuit which is preferably grounded as at 24 and the plate $c$ being connected to the output impedance 21 by means of the conductor 25, the arrangement being such that the plate $a$ when movable in opposite directions as indicated by the arrows in Fig. 4 changes the capacity between the plate set $a$—$b$ inversely to the change in capacity between the plate set $a$—$c$.

By the provision of this three-element compensating condenser, the neutralizing capacity of the condenser $a$—$c$ (which in effect is across the grid circuit because of the negligible impedance of the winding 21) may be adjusted without changing the tuning characteristics or period thereof. This method of compensating for the grid plate capacity without detuning the grid circuit is described and claimed in the application of Lester L. Jones for capacitive coupling control system, Ser. No. 607,046, filed Dec. 15, 1922.

Referring now to Figs. 1 to 3 of the drawings, I show the construction of my improved compensating condenser in which the movable plate $a'$ is fixed to a rotor element generally designated as $r$ and the plates $b'$ and $c'$ are fixed to a stator element generally designated as $s$.

The rotor element $r$ preferably comprises a circular block or body 26 of insulating material recessed at 27, in which recess the semicircular plate $a'$ is seated, the said plate being secured to the insulating block by means of the securing elements 28, 28 and 29, the securing element 29 being constructed to form a binding post for receiving a connector 30. The rotor further includes an operating shaft 31 being enlarged at one end 31' and reduced at the other end $31^2$, the reduced end being threaded as at 32 for receiving a correspondingly tapped bore 33 provided in the insulating block 26, the block being threadedly fixed in adjusted position on the shaft in the assembling of the parts and locked in adjusted position by means of the lock nuts 34 bearing preferably upon a washer 35.

The stator $s$ comprises the block or body of insulating material 36 on which the plates $b'$ and $c'$ are fixed by means of the sets of securing elements 37 and 38 respectively.

For holding the plate $a'$ in properly spaced relation relatively to the plates $b'$ and $c'$ during adjustment and use of the condenser, I provide a resilient means carried by one of the plate elements and resiliently bearing upon the other to hold the plates in position and resiliently against a sheet of dielectric material 39 arranged between the rotor and stator plates. In the preferred construction this resilient means comprises a spring housing or cup 40 threadedly received centrally of the stator block 36, as clearly shown in the drawings, the said cup housing a compression spring 41 which surrounds the reduced end $31^2$ of the shaft and bears at one end on the bottom of the cup 40 and at the other end on the shoulder 42 of the enlarged end $31'$ of the shaft or on an interposed washer 43. By the provision of this construction it will be seen that the rotor and stator elements are always maintained in the desired relatively spaced relation by means furthermore which is concealed and housed by the parts against displacement and accidental disturbance.

For the purpose of efficiently connecting the shaft 31 to the ground plate $b'$ so that the former may be effectively maintained at ground potential at all times, I provide the conductive connection 44 between and held in position by the spring cup 40 and the plate $b'$, as will be clear from a consideration of Figs. 1 and 2 of the drawings.

For more effectively shielding the high potential plates $a'$ and $c'$, it is desirable to provide an electrostatic shield plate 45 which is connected to the ground plate $b'$ by means of one or more of the securing screws 37 as clearly shown in Fig. 1 of the drawings, the said shield plate being constructed so as to form the carrier or support for all the parts of the condenser and being provided with a plurality of orifices 46 which are adapted to receive securing means for attaching the compensating condenser to a support such as a panel 47.

For the purpose of facilitating the assembling of the receiving sets in which the compensating condenser forms a component part, I have found it desirable to provide distinguishable means on the three plates so as to permit quick selection of the same for connection to the different parts of the receiving circuit. To this end the high potential plate $a'$ is provided with the connector 30, the high potential plate $c'$ is provided with a distinguishable means 48 adapted for receiving a conductor, and the shield plate 45 which is at ground potential by reason of its connection to the ground plate $b'$ is provided with further distinguishable connecting means 49. With this construction little difficulty is experienced by the operator in selecting the correct plate in assembling the circuit parts.

For the purpose of limiting the rotation of the rotor with respect to the stator from a full maximum capacitive position of one plate set $a'$—$c'$ to the full maximum capacitive position of the other plate set $a'$—$b'$, I prefer to provide stop means consisting of the two stop pins 51 and 52 carried by the stator block 36 and the stop pin 53 carried by the rotor block 26, the sheet of dielectric material 39 being provided with an orifice 54 through which the stop pin 53 projects.

The manner of constructing, assembling and using my improved compensating condenser will in the main be fully apparent from the above detailed description thereof. In assembling the parts, it will be seen that the shaft 31, to the enlarged end of which may be secured the dial 50, is first inserted in the stator $s$ until the shoulder 42 engages the washer 43, the stator $r$ being then rotated on the threaded end 32 of the shaft until the desired resilient spacing between the plates is obtained, the rotor block 26 being then locked in position by means of the lock nuts 34.

While I have shown my device in the preferred form, it will be obvious that many changes and modifications may be made in the structure disclosed without departing from the spirit of the invention, defined in the following claims.

I claim:—

1. A variable condenser comprising relatively movable elements providing a plurality of condenser plate sets, relative movement of the said elements being effective for varying the capacity of one set inversely with respect to the other set, and resilient means carried by one of the elements and bearing on the other of the elements for holding the plate sets in properly spaced relation.

2. A variable condenser comprising a rotor and a stator providing a plurality of condenser plate sets, movement of the rotor being effective for varying the capacity of one set inversely with respect to the other set and resilient means carried by the stator and bearing on the rotor for holding the plate sets in properly spaced relation.

3. A variable condenser comprising relatively movable elements providing a plurality of condenser plate sets, an insulating medium between the elements, means including a shaft for moving one of said elements to vary the capacity of one set inversely with respect to the other set, and resilient means carried by the other of the elements and bearing on said shaft for urging the movable element against the insulating medium and thereby holding the plate sets in properly spaced relation.

4. A variable condenser comprising a rotor and a stator providing a plurality of condenser plate sets, an insulating medium between the elements, means including a shaft for moving the rotor to vary the capacity of one set inversely with respect to the other set and resilient means carried by the stator and bearing on the said shaft for urging the rotor against the insulating medium and thereby holding the plate sets in properly spaced relation.

5. A variable condenser comprising a stator element provided with two stator plates, a movable element provided with a plate common to the stator plates and movable relatively to the two stator plates in inverse capacitive relation, an insulating medium between the elements and resilient means carried by one of said elements and bearing on the other for urging the rotor element against the insulating medium and thereby holding the plates in properly spaced relation.

6. A variable condenser comprising a stator element provided with two stator plates, a rotor element provided with a rotor plate common to the stator plates and movable relatively to the two stator plates in inverse capacitive relation, a sheet of dielectric material between the elements and resilient means carrier by the stator element and bearing on the rotor element for urging the rotor element against the sheet of dielectric material and thereby holding the plates in properly spaced relation.

7. A variable condenser comprising a stator element, a rotor element, a dielectric medium between the elements, and resilient means carried by and housed within the stator element and bearing upon the rotor element for urging the latter against the dielectric medium and thereby holding the elements in constant spaced relation during rotation of the rotor element.

8. A variable condenser comprising a stator element attachable to a support such as a panel, a rotor element including a shaft, an insulating medium between the elements and resilient means carried by and housed within the stator element arranged to bear upon the said shaft for urging the rotor element against the insulating medium and thereby holding the elements in a constant spaced relation during rotation of the rotor element.

9. A variable condenser comprising a stator consisting of an insulating plate and a condenser plate carried thereby, a rotor also consisting of an insulating plate and a condenser plate carried thereby, a shaft carrying the rotor insulating plate, and a helical spring carried by the stator insulating plate arranged to surround the shaft and bear axially upon the same for holding the stator and rotor in a constant spaced relation during rotation of the rotor.

10. A variable condenser comprising a stator consisting of an insulating plate and a condenser plate carried thereby, a rotor also consisting of an insulating plate and a condenser plate carried thereby, a sheet of dielectric material arranged between said condenser plates, and resilient means carried by the stator and bearing upon the rotor for always holding the condenser plates against the said sheet of dielectric material during operation of the rotor.

11. A variable condenser comprising a stator consisting of an insulating plate provided with two stator condenser plates, a spring housing threadedly carried centrally of said insulating plate, a rotor consisting of an insulating plate provided with a condenser plate, a shaft attached to said rotor insulating plate and a resilient member in said housing arranged to bear upon said shaft to hold said condenser plates in properly spaced relation.

12. A variable condenser comprising a stator consisting of an insulating plate provided with two stator condenser plates, a spring housing threadedly carried centrally of said insulating plate, a rotor consisting of an insulating plate provided with a condenser plate, a shaft threadedly attached to said rotor insulating plates and a resilient member in said housing arranged to bear upon said shaft to hold said condenser plates in properly spaced relation.

13. A variable condenser comprising relatively movable elements providing a plurality of condenser plates, an electrically conducting shaft carrying the movable element and insulated from a condenser plate thereon, and resilient means carried by the stationary element and conductively connected to a condenser plate thereon, the said resilient means being arranged to bear on said shaft for holding the elements in properly spaced relation.

14. A variable condenser comprising a stator element provided with a plurality of condenser plates, a rotor element provided with a condenser plate, a shaft carrying the rotor element and insulated from its condenser plate, and resilient means carried by the stator element conductively connected to one of the condenser plates thereon, the said resilient means being arranged to bear on said shaft for holding the rotor and stator elements in properly spaced relation.

15. A variable condenser comprising a stator consisting of an insulating plate and a plurality of condenser plates thereon, a rotor consisting of an insulating plate and a condenser plate thereon, a shaft carrying the rotor and insulated from its condenser plate, a sheet of dielectric material arranged between the stator and rotor condenser plates, and resilient means carried by the stator and conductively connected to one of the condenser plates thereon, the said resilient means being arranged to bear on said shaft for holding the condenser plates against the said sheet of dielectric material.

16. A variable condenser comprising a stator consisting of an insulating plate and a pair of condenser plates thereon, a rotor consisting of an insulating plate and a condenser plate thereon, a shaft carrying the rotor and insulated from its condenser plate, a spring housing threadedly carried centrally of said stator insulating plate and conductively connected to one of the condenser plates thereon, and a resilient member in said housing arranged to bear at one end against the housing and at the other end upon said shaft to hold the rotor and stator in properly spaced relation.

17. A variable condenser comprising relatively movable elements providing a plurality of condenser plates, an electrically conducting shaft carrying the movable element and insulated from a condenser plate thereon, and resilient means carried by the stationary element and conductively connected to a condenser plate thereon, the said resilient means being arranged to bear axially on said shaft for holding the elements in constant spaced relation during movement of the movable element and an electrostatic shield connected to said condenser plate of said stationary element.

18. A variable condenser comprising a stator element provided with two stator plates, a rotor element provided with a rotor plate common to the stator plates, resilient means carried by the stator element and conductively connected to one of the plates thereon, said resilient means being arranged to bear on a part of the rotor element; and an electrostatic shield electrically connected to the plate to which the resilient means is connected.

19. A variable condenser comprising a stator provided with a pair of condenser plates, a rotor having a condenser plate, an electrostatic shield conductively connected to one of the stator plates and distinguishable means on the electrostatic shield and the other of the stator plates adapted for circuit connections.

Signed at New York city, in the county of New York and State of New York, this 6th day of Decbr. A. D. 1923.

CHARLES HARDY.